R. W. GOODHART.
PNEUMATIC TIRE.
APPLICATION FILED MAR. 1, 1920.
1,364,931. Patented Jan. 11, 1921.
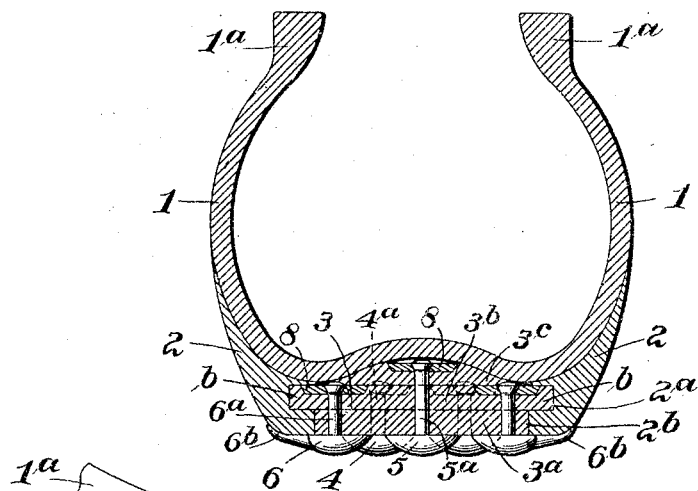
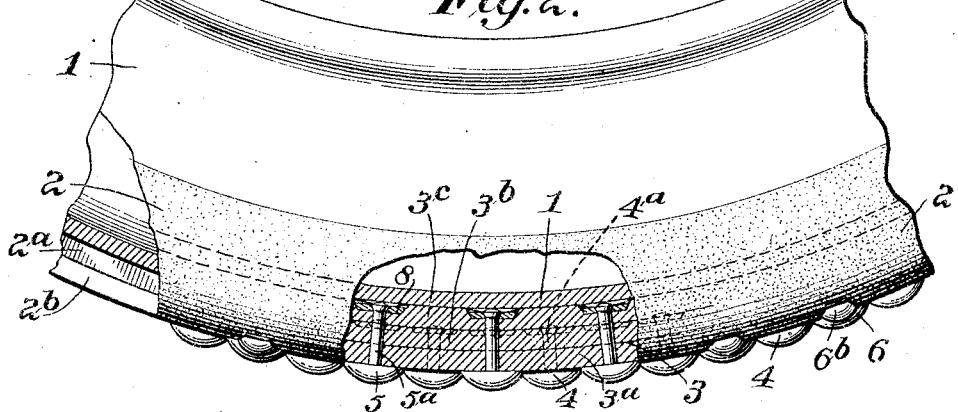
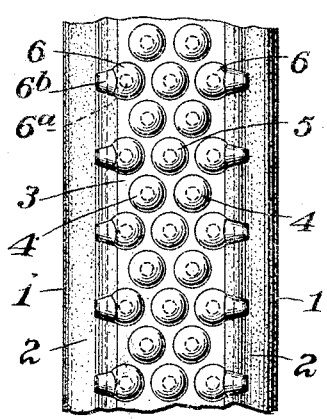
Richard W. Goodhart,

UNITED STATES PATENT OFFICE.

RICHARD W. GOODHART, OF PENSACOLA, FLORIDA.

PNEUMATIC TIRE.

1,364,931.  Specification of Letters Patent.  Patented Jan. 11, 1921.

Application filed March 1, 1920. Serial No. 362,202.

*To all whom it may concern:*

Be it known that I, RICHARD W. GOODHART, a citizen of the United States, and a resident of Pensacola, in the county of Escambia and State of Florida, have invented certain new and useful Improvements in Pneumatic Tires, of which the following is a specification.

My present invention relates to improvements in the outer casings or shoes of double tube pneumatic tires of the non-skid type, and aims to provide a simple, durable, and efficient construction in which the tread is constructed as a separate unit, the construction being such that it is capable of being easily manufactured and assembled.

With these and other objects in view the invention includes the novel features of construction and arrangement and combination of parts hereinafter described and particularly defined by the appended claims.

An embodiment of my invention is illustrated in the accompanying drawings in which—

Figure 1 is a transverse section through a shoe or casing constructed in accordance with my invention.

Fig. 2 is a fragmentary side elevation of the same.

Fig. 3 is a detailed view of one of the studs.

Fig. 3$^a$ is a detail of one of the non-skid studs and its washer before assembly.

Fig. 4 is a transverse section through the tread strip as it appears ready to be placed in the body of the shoe or casing and before the marginal studs are bent, and Fig. 5 is a fragmentary face view of the tread portion of the complete tire.

Referring by reference characters to this drawing the numeral 1 designates the body or carcass of the shoe or casing which may be made of the customary tire material and have the usual rim engaging edges or beads as indicated at 1$^a$. To the exterior surface of this body at each side of the tread portion thereof I vulcanize a tread retaining strip indicated at 2 each of which has a thicker outer portion and a tapering inner portion merging into the side wall of the tire. These tread retaining portions are provided in their inner faces with laterally opening annular grooves or channels 2$^a$ which are designed to receive the laterally projecting edges or flanges $b$ of the non-skid tread strip 3.

This tread strip is preferably composed of a plurality of layers of tread material, say fabric and rubber, three layers being shown in the drawing as the preferred number, these layers being designated respectively 3$^a$, 3$^b$, and 3$^c$, the intermediate layer 3$^b$ being wider than the others, or having its edges projected to form the ribs or flanges $b$ above referred to. The inner layer 3$^c$ is preferably of the shape of the segment of a circle in cross section with its curved face toward the interior of the casing so that the tread portion of the carcass will be bowed inwardly as shown in Fig. 1. The non-skid studs are indicated by the numerals 4, 5 and 6 and have shanks 4$^a$, 5$^a$ and 6$^a$ which are extended through the layers of the tread portion and through washers 8 on the inner face thereof, their inner ends being headed down upon the washers as shown to hold them in position.

The studs are preferably arranged in rows as shown, the studs of one row being staggered in relation to those of the adjoining row, and the shanks of the studs of the side rows are shorter than those of the central row as they pass through only the two outer tread layers due to the shape and width of the inner tread layer. Such a tread may be manufactured readily as a separate and unitary article and be easily and quickly applied to the body or carcass by bending the side walls thereof toward each other to separate the lips or flanges 2$^b$ of the parts 2 which overhang the channels 2$^a$. The flanges 3$^b$ may thereby be readily inserted in said channels and as the sides of the shoe or casing are forced or bowed outwardly by the pressure of air when the tire is inflated the tread will be firmly held in position. To further guard against its working out of position when in use I prefer to utilize the outside rows of studs 6 as additional securing means and to this end provide them with elongated portions or projections 6$^b$ which normally or before application of the tread to the carcass extend straight as shown in Fig. 4, but which, being of malleable metal can be bent over against the corners of the strips 2 as shown in Fig. 1.

Having thus described my invention what I claim is—

1. A tire shoe or casing having a tread receiving channel in the periphery thereof, the walls of said channel having inwardly opening grooves, a tread member having marginal flanges to engage said grooves, and non-skid studs carried by said tread member, certain of said studs having laterally extending projections bent up around the adjoining portions of the casing.

2. A tire shoe or casing comprising a body or carcass, spaced tread retaining strips carried thereby having annular channels in their inner faces, an independent tread member having laterally projecting flanges to engage said grooves, and non-skid studs carried by said tread member in proximity to the margins thereof, said studs having laterally extending bendable projections for engaging said tread retaining strips.

In testimony whereof, I affix my signature.

RICHARD W. GOODHART.